E. G. JOHANSON.
GLASS.
APPLICATION FILED MAY 19, 1917.

1,249,408.

Patented Dec. 11, 1917.

Emil G. Johanson
INVENTOR.

BY *Miles B. Stevens & Co.*
ATTORNEYS.

UNITED STATES PATENT OFFICE.

EMIL G. JOHANSON, OF CHICAGO, ILLINOIS.

GLASS.

1,249,408.

Specification of Letters Patent.   Patented Dec. 11, 1917.

Application filed May 19, 1917. Serial No. 169,701.

*To all whom it may concern:*

Be it known that I, EMIL G. JOHANSON, a subject of the King of Sweden, residing at Chicago, in the county of Cook and State of Illinois, have invented new and useful Improvements in Glass, of which the following is a specification.

This invention has for its object to provide a simple and inexpensive translucent glass structure designed for use in connection with motor vehicle headlights, office partitions, windows and other structures where a glass is desired which transmits the light rays diffusely, and which eliminates glare.

In the accompanying drawing

Figure 1:
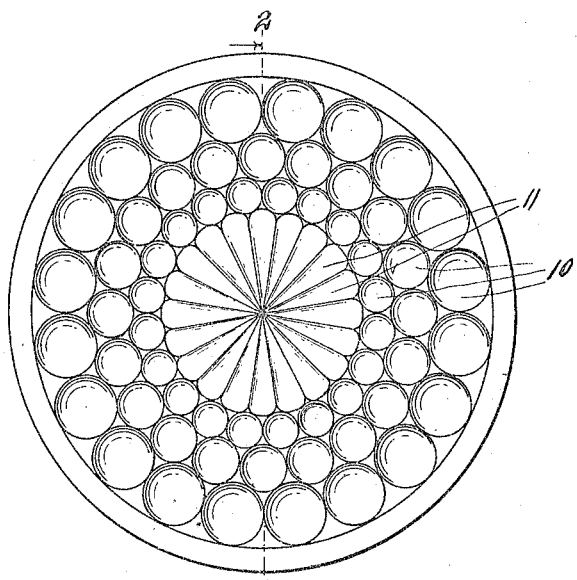
Figure 1 is an elevation of a glass for a headlight.
Figure 2:
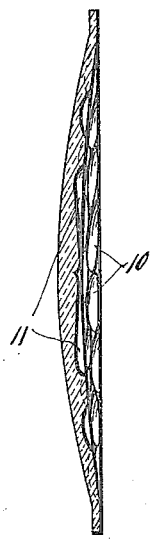
Fig. 2 is a cross-section thereof on the line 2—2 of Fig. 1.

Referring specifically to the drawing and more particularly to Figs. 1 and 2, the glass here shown is circular and concavo-convex, it being designed to serve as the lens or front of a motor vehicle or other headlight from which it is desired to eliminate intense glare. The concave side of the glass is formed with a series of circular depressions 10, the same being arranged in concentric circles, and those of one circle being situated in alternation with those of the next inner and outer circles. On account of the concentric arrangement of the circles, the recesses increase in diameter radially outward from the center of the glass and at the center is a series of radial recesses 11 tapering toward and meeting at the center.

By the recesses 10 the light passing through the glass is diffused and softened and all glare is eliminated, and as the recesses are on the inner concave side of the glass and the outer exposed face is left perfectly smooth, the glass can be easily kept clean as the exposed face is totally devoid of protuberances or recesses to catch mud, dirt, etc.

Figure 3:
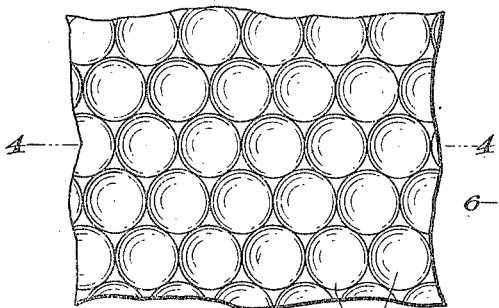
Fig. 3 is a plan view of a glass suitable for partitions, windows, etc.
Figure 4:
Fig. 4 is a cross section thereof on the line 4—4 of Fig. 3.

Figs. 3 and 4 show a plain glass having circular recesses 12 on one side extending in parallel rows across the same.

Figure 5:
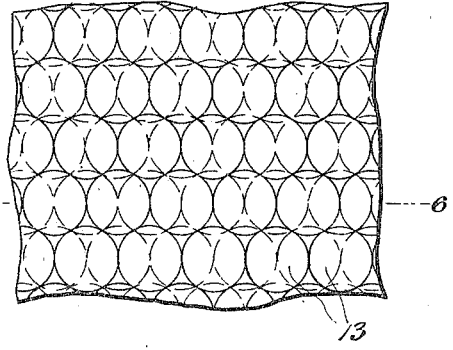
Fig. 5 is a plan view showing a slight modification.
Figure 6:
Fig. 6 is a cross section on the line 6—6 of Fig. 5.

Figs. 5 and 6 show a plain glass having circular recesses 13 on one side and similar recesses 14 on the other side, both faces of the glass being thus recessed. The recesses also extend in straight rows across the glass, and the recesses on one side are arranged staggered with respect to those on the other side to overlap the same.

The recesses in the several embodiments of the invention effectually serve the purpose for which they are designed, and the glass can be easily and cheaply manufactured, and as the recesses are formed by protuberances on the mold the chances of imperfections in the glass are reduced to a minimum.

The glass shown in Figs. 3 to 6 can be employed for office partitions, windows or wherever it is desired to have the light diffused.

I claim:

1. As a new article of manufacture, a glass front for head lamps having its rear face formed with plano-concave lenses arranged in concentric circles, the lenses in the circles increasing in diameter radially outward from the center of the glass.

2. As a new article of manufacture, a glass front for head lamps having its rear surface formed with circular recesses arranged in concentric circles, the recesses in the circles increasing in diameter radially outward from the center of the glass.

3. As a new article of manufacture, a glass front for head lamps having its rear surface formed with recesses arranged in concentric circles, the recesses in the circles increasing in size radially outward from the center of the glass.

In testimony whereof I affix my signature.

EMIL G. JOHANSON.